(12) United States Patent
Tanaka

(10) Patent No.: US 7,863,356 B2
(45) Date of Patent: Jan. 4, 2011

(54) RESIN COMPOSITION AND MOLDED ARTICLE

(75) Inventor: Yuuichirou Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 12/442,465

(22) PCT Filed: Jan. 29, 2009

(86) PCT No.: PCT/JP2009/051924

§ 371 (c)(1), (2), (4) Date: Mar. 23, 2009

(87) PCT Pub. No.: WO2009/104479

PCT Pub. Date: Aug. 27, 2009

(65) Prior Publication Data

US 2010/0184888 A1     Jul. 22, 2010

(30) Foreign Application Priority Data

Feb. 22, 2008    (JP) .............................. 2008-042180

(51) Int. Cl.
    *C08K 5/34*      (2006.01)

(52) U.S. Cl. ........................................ 524/100; 524/99

(58) Field of Classification Search ................... 524/100
See application file for complete search history.

(56) References Cited

U.S. PATENT DOCUMENTS

| | | | |
|---|---|---|---|
| 3,930,079 A | | 12/1975 | Hashizume et al. |
| 5,767,082 A | * | 6/1998 | Nestor et al. .................. 514/15 |
| 2009/0018264 A1 | | 1/2009 | Fuseya |
| 2009/0043018 A1 | | 2/2009 | Tanaka et al. |
| 2009/0124763 A1 | * | 5/2009 | Matsuda et al. ............. 525/437 |

FOREIGN PATENT DOCUMENTS

| | | |
|---|---|---|
| FR | 2298577 A1 | 8/1976 |
| JP | 2007-191630 A | 8/2007 |
| WO | 2007/052847 A1 | 5/2007 |

* cited by examiner

*Primary Examiner*—Ling-Siu Choi
*Assistant Examiner*—Hui Chin
(74) *Attorney, Agent, or Firm*—Fitzpatrick, Cella, Harper & Scinto

(57) ABSTRACT

The invention provides a resin composition containing polyethylene furandicarboxylate having high crystallization rate and excellent heat resistance, and a molded article molded with the resin composition. The resin composition contains polyethylene furandicarboxylate and pyrimidine thiol.

4 Claims, 1 Drawing Sheet

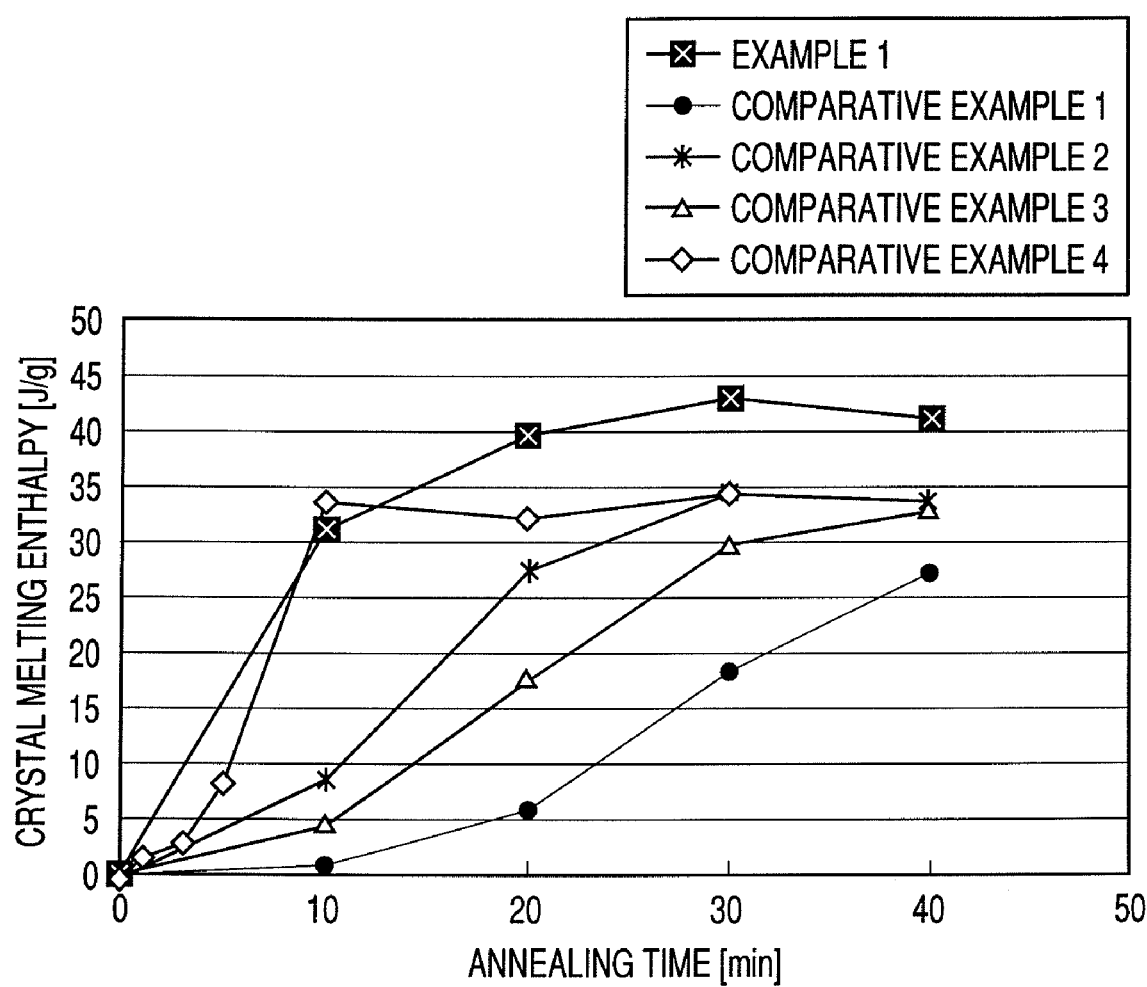

RESIN COMPOSITION AND MOLDED ARTICLE

TECHNICAL FIELD

The present invention relates to a resin composition and a molded article, and particularly to a resin composition containing plant-derived polyethylene furandicarboxylate with high crystallization rate and high heat resistance, and to a molded article molded with this composition.

BACKGROUND ART

In recent years, researches on resins synthesized from raw materials derived from plants without using petroleum have been extensively carried on in order to cope with environmental problems such as global warming and exhaustion of fossil resource. In particular, researches on polylactic acid as a resin derived from plants have been carried on, and various products have been introduced to practical applications.

Thermoplastic resins typified by polylactic acid are generally classified into non-crystalline resins and crystalline resins, and the latter resins can be crystallized by a heat treatment. In the case of the crystalline resin, its heat resistance can be improved by crystallization, so that the resin is desirably crystallized before use rather than used in a non-crystalline state. However, when the resin is subjected to, for example, injection molding, it is necessary to hold the resin in a temperature-controlled mold for a certain period of time after injecting the resin for sufficiently conducting crystallization, and it is necessary to increase the crystallization rate thereof for improving productivity.

In order to use a resin composition as an injection-molded product, the resin composition is often required to have high heat resistance for the reasons in terms of service and transport environments of the product. Therefore, the resin composition is required to combine high crystallization rate with high heat resistance for practical applications.

As a technique for increasing the crystallization rate, it is known to add a crystal nucleating agent into a resin composition. For example, Japanese Patent Application Laid-Open No. 2007-191630 has reported that a phosphoric ester metal salt is effective as a crystal nucleating agent for polylactic acid that is a typical plant-derived resin, and NA-11 (product of ADEKA Co., Ltd.) is particularly most suitable for the agent.

On the other hand, polyethylene furandicarboxylate is known as a plant-derived resin. The merit of polyethylene furandicarboxylate is to have excellent heat resistance compared with polylactic acid. However, the most suitable crystal nucleating agent for polyethylene furandicarboxylate has not been yet known.

DISCLOSURE OF THE INVENTION

The present invention has been made in view of such background art and has as its object the provision of a resin composition containing polyethylene furandicarboxylate having high crystallization rate and excellent heat resistance, and a molded article molded with the composition.

In order to achieve the above object, the present invention provides a resin composition comprising polyethylene furandicarboxylate and pyrimidine thiol.

The present invention also provides a molded article molded with the above-described resin composition.

EFFECTS OF THE INVENTION

The present invention can provide the resin composition containing polyethylene furandicarboxylate having high crystallization rate and excellent heat resistance and molded articles molded with such a resin composition. Since the resin composition according to the present invention has a high crystallization rate, high productivity can be realized in a process of injection molding. In addition, various applications of molded articles can be realized because the resin composition has high heat resistance.

Further features of the present invention will become apparent from the following description of exemplary embodiments with reference to the attached drawings.

BRIEF DESCRIPTION OF THE DRAWING

FIG. 1 diagrammatically illustrates comparison in crystallization rate between Example and Comparative Examples in regard to the present invention.

BEST MODE FOR CARRYING OUT THE INVENTION

The present invention will hereinafter be described in detail.

Improvement in the crystallization rate of a resin depends on two rates of a crystal nucleus formation rate and a crystal growth rate. As a result of extensive researches, the present inventor has found that a crystal nucleating agent has a great effect on the former. It has further been found that the crystal nucleus formation rate depends not only on the structure of the nucleating agent but also on its compatibility with the resin.

Based on the above findings, compounds having a melting point higher than polyethylene furandicarboxylate among compounds with a X-ray diffraction (XRD) spectrum similar to that of polyethylene furandicarboxylate have been used as crystal nucleating agents to verify their crystallization-promoting effects. As a result, it has been found that crystallization-promoting effect is particularly marked in a combination of polyethylene furandicarboxylate with pyrimidine thiol, thus leading to the present invention.

More specifically, the resin composition according to the present invention contains polyethylene furandicarboxylate and pyrimidine thiol.

Pyrimidine thiol used in the present invention is a compound obtained by bonding a thiol (—SH) group to a compound obtained by substituting nitrogen atoms for carbon atoms at 1 and 3 positions of benzene (pyrimidine). In particular, 3,4,5,6-tetrahydro-2-pyrimidine thiol is favorable.

The content of pyrimidine thiol contained in the resin composition according to the present invention is from 0.5 parts by weight or more to 10 parts by weight or less, favorably from 0.5 parts by weight or more to 5.0 parts by weight or less, more favorably from 0.5 parts by weight or more to 3.0 parts by weight or less, per 100 parts by weight of the total of polyethylene furandicarboxylate and pyrimidine thiol. If the content is less than 0.5 parts by weight, it is difficult to improve the crystallization rate. If the content exceeds 10 parts by weight, the effect of improving the crystallization rate is saturated, and the resulting resin composition shows deterioration of physical properties because the weight ratio of the resin is lowered.

The resin composition according to the present invention may contain various additives such as an inorganic filler, an elastomer, a flame retardant, an antioxidant, a light stabilizer, an ultraviolet absorbent, a hydrolysis inhibitor, a pigment and a dye as other components.

A method for adding pyrimidine thiol to polyethylene furandicarboxylate will now be described. A mixture of pellets of polyethylene furandicarboxylate and pyrimidine thiol powder, which are mixed at a certain weight ratio in advance, is charged into a twin-screw kneader controlled to a temperature not lower than the melting point of the resin and kneaded for a certain period of time. The aggregated powder of pyrimidine thiol is ground by shear stress generated by the screws of the kneader and uniformly dispersed in the resin to obtain a resin composition.

The resin composition thus prepared can be pelletized by a pelletizer.

The molded article according to the present invention can be obtained by molding the above-described resin composition. As examples of a molding method, may be mentioned injection molding, extrusion, blow molding and laminate molding.

EXAMPLES

The present invention is described more specifically by the following Examples. However, the present invention is not limited by the following Examples. The evaluation as to the crystallization rate was made according to the following method.

A resin composition was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

This amorphous sample was subjected to an annealing treatment for prescribed periods of time at 140° C. in a dryer to prepare plural samples different in degree of crystallinity.

The crystal melting enthalpies [J/g] of the resultant samples were evaluated at a heating rate of 20° C./min by a differential scanning calorimeter (DSC). Here, the greater crystal melting enthalpy indicates the greater degree of crystallinity. Accordingly, it follows that the crystallization rate is higher as the crystal melting enthalpy is greater so far as the annealing time is the same.

In order to evaluate the samples as to heat resistance, the glass transition temperature (Tg) and melting point (mp) of each sample were measured at a heating rate of 20° C./min by the differential scanning calorimeter (DSC).

Example 1

A mixture obtained by mixing 99 parts by weight of polyethylene furandicarboxylate and 1 part by weight of 3,4,5,6-tetrahydro-2-pyrimidine thiol was provided. The mixture was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The crystal melting enthalpies of the thus-prepared amorphous sample and samples subjected to the annealing treatment were illustrated in FIG. 1. The crystal melting enthalpy at the annealing time of 10 minutes was 31 [J/g], and the crystallization progressed at a crystallization rate of 3.1 [J/g·min]. Tg was 83° C., and mp was 202° C.

Comparative Example 1

100 parts by weight of polyethylene furandicarboxylate was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The crystal melting enthalpies of the thus-prepared amorphous sample and samples subjected to the annealing treatment were illustrated in FIG. 1. The crystal melting enthalpy at the annealing time of 40 minutes was 27 [J/g], and the crystallization progressed at a crystallization rate of 0.7 [J/g·min]. It was confirmed that the crystallization rate was 4.4 times slower compared with Example 1. Tg was 84° C., and mp was 197° C., and so its heat resistance was equivalent to Example 1.

Comparative Example 2

99 parts by weight of polyethylene furandicarboxylate and 1 part by weight of 2-thiohydantoin were charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The crystal melting enthalpies of the thus-prepared amorphous sample and samples subjected to the annealing treatment were illustrated in FIG. 1. The crystal melting enthalpy at the annealing time of 30 minutes was 34 [J/g], and the crystallization progressed at a crystallization rate of 1.1 [J/g·min]. It was confirmed that the crystallization rate was 2.8 times slower compared with Example 1. Tg was 84° C., and mp was 200° C., and so its heat resistance was equivalent to Example 1.

Comparative Example 3

99 parts by weight of polyethylene furandicarboxylate and 1 part by weight of xanthine were charged into a Laboplastmill mixer (trade name, blade: roller type, manufactured by Toyoseiki Seisakusho Co., Ltd.) and melt-kneaded with twin-screw counter-rotation at 50 rpm under a temperature condition of 230° C. to obtain a resin composition.

The resin composition thus obtained was placed on an aluminum plate and heated for 5 minutes at 230° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The crystal melting enthalpies of the thus-prepared amorphous sample and samples subjected to the annealing treatment were illustrated in FIG. 1. The crystal melting enthalpy at the annealing time of 30 minutes was 30 [J/g], and the crystallization progressed at a crystallization rate of 1.0 [J/g·min]. It was confirmed that the crystallization rate was 3.1 times slower compared with Example 1. Tg was 85° C., and mp was 201° C., and so its heat resistance was equivalent to Example 1.

Comparative Example 4

100 parts by weight of a polylactic acid resin was charged into a Laboplastmill mixer (trade name, blade: roller type, manufactured by Toyoseiki Seisakusho Co., Ltd.) and melt-kneaded with twin-screw counter-rotation at 50 rpm under a temperature condition of 200° C. to obtain a resin composition.

The resin composition thus obtained was placed on an aluminum plate and heated for 5 minutes at 200° C. in a muffle furnace, and a sample in a molten state was taken out of the muffle furnace and then immediately immersed in water of 25° C. for 3 minutes to quench it, thereby providing an amorphous sample.

The thus-obtained amorphous sample was subjected to an annealing treatment at 140° C. in a dryer. The times of the annealing treatment were 10, 20, 30 and 40 minutes. After the annealing treatment, the samples were taken out of the dryer to obtain samples different in degree of crystallinity.

The crystal melting enthalpies of the thus-prepared amorphous sample and samples subjected to the annealing treatment were illustrated in FIG. 1. The crystal melting enthalpy at the annealing time of 10 minutes was 33 [J/g], and the crystallization progressed at a crystallization rate of 3.3 [J/g·min]. Tg was 58° C., and mp was 165° C., and so Tg and mp were lower by about 30° C. and 20° C., respectively, compared with Example 1.

The results of comparison in crystallization rate, glass transition temperature and melting point between the resin compositions of Example and Comparative Examples are shown in Table 1.

TABLE 1

|  | Tg (° C.) | mp (° C.) | Crystallization rate (J/g · min) |
|---|---|---|---|
| Ex. 1 | 83 | 202 | 3.1 |
| Comp. Ex. 1 | 84 | 197 | 0.7 |
| Comp. Ex. 2 | 84 | 200 | 1.1 |
| Comp. Ex. 3 | 85 | 201 | 1.0 |
| Comp. Ex. 4 | 58 | 165 | 3.3 |

INDUSTRIAL APPLICABILITY

The present invention is very useful in a wide variety of industrial fields using resin compositions intended to be used as plastic molded products. In particular, since the resin composition according to the present invention using a plant-derived resin as a raw material is equivalent in crystallization rate and excellent in heat resistance compared with the prior art, not only productivity is improved but also the application range of molded products can be greatly enlarged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042180, filed Feb. 22, 2008, which is hereby incorporated by reference herein in its entirety.

The invention claimed is:

1. A resin composition comprising poly(ethylene furandicarboxylate) and pyrimidine thiol.

2. The resin composition according to claim 1, wherein the pyrimidine thiol is 3,4,5,6-tetrahydro-2-pyrimidine thiol.

3. The resin composition according to claim 1, wherein a content of the pyrimidine thiol is from 0.5 parts by weight or more to 10 parts by weight or less per 100 parts by weight of a total of the poly(ethylene furandicarboxylate) and the pyrimidine thiol.

4. A molded article molded with the resin composition according to claim 1.

* * * * *